May 2, 1967     T. H. WALL ETAL     3,316,904
FILTERING WEB FOR FACE MASKS AND FACE MASKS MADE THEREFROM
Filed July 31, 1961
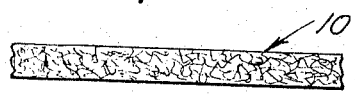
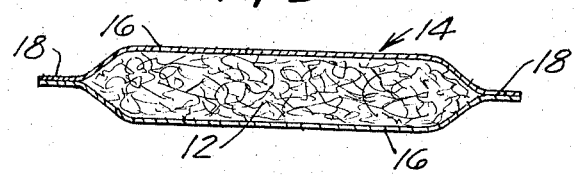
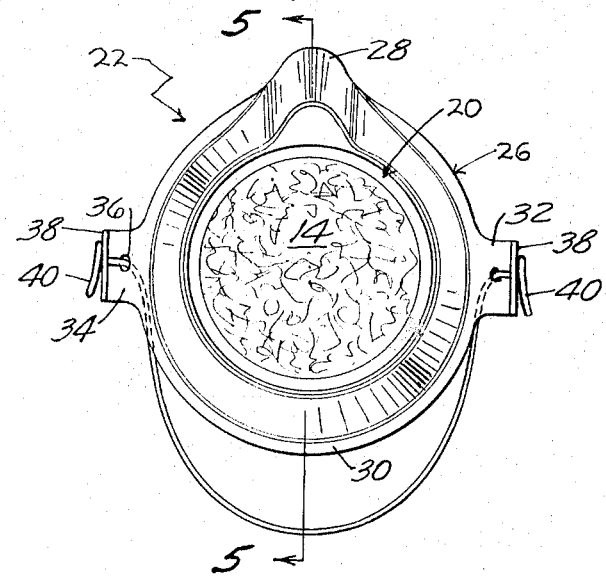
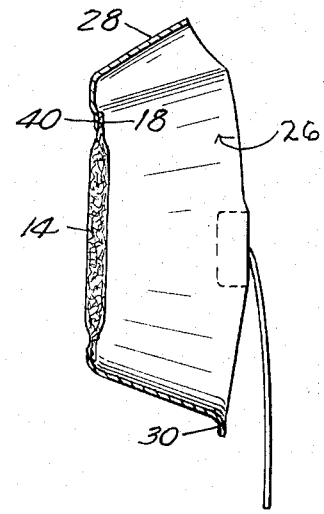
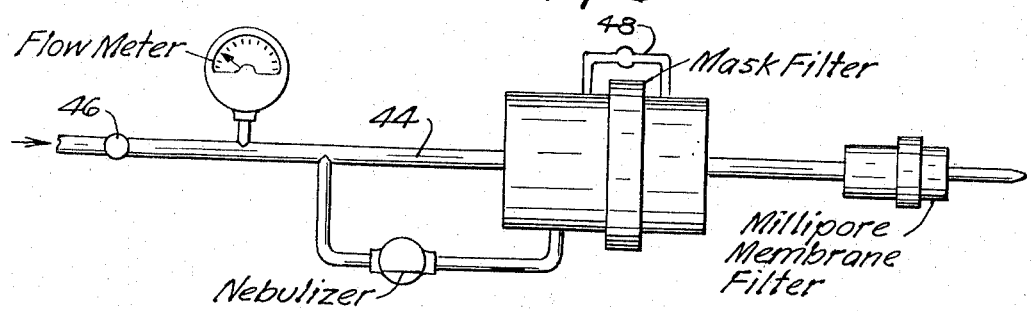
INVENTORS
THOMAS H. WALL &
PAUL E. HANSEN
Carpenter, Abbott, Coulter & Kinney
ATTORNEYS 3,316,904
FILTERING WEB FOR FACE MASKS AND FACE MASKS MADE THEREFROM
Thomas H. Wall, St. Paul, and Paul E. Hansen, North St. Paul, Minn., assignors to Minnesota Mining and Manufacturing Company, St. Paul, Minn., a corporation of Delaware
Filed July 31, 1961, Ser. No. 127,958
6 Claims. (Cl. 128—146.6)

The present invention relates to filtering materials and more particularly relates to a non-woven filtering web having remarkably high filtration efficiency for very small particles, being capable of filtering a high percentage of bacteria from air while functioning as a breathe-through filter medium.

The filtering web of this invention is an improvement over existing filtering media, particularly over filtering media used in face masks and the like where it is desired that a high percentage of bacteria in bacteria-laden air be filtered from such air during inhalation or exhalation through the filtering media. While filtering webs made in accordance with this invention are particularly useful for face masks, they are also useful as the filtering elements in air-conditioning units, vacuum cleaners, furnaces, and in other environments, particularly where high filtering efficiency of very small particles is desired. But the combination of high filtration efficiency and breathability make these webs highly effective as filtering elements in face masks.

The wearing of protective face masks to filter out noxious gases and fumes from inhaled air has been a common industrial practice for a long time. The wearing of protective face masks to filter bacteria laden aerosol droplets during exhalation and to prevent inhalation of bacteria laden air-borne droplets as a health preserving measure in hospitals and other possible contagion areas has been practiced for some time. The wearing of face masks during surgery has been more or less standard since the early 1900's. The ideal of all such masks is maximum filtering efficiency while providing absolutely no hindrance to breathing therethrough. While this ideal may be illusory, it is believed the present invention approaches this ideal more closely than present mask filters.

The most common surgical mask in use today, while it is reasonably comfortable to breathe through, utilizes a filter media composed of layers of gauze covering the nose and mouth. The bacteria filtration efficiency of such gauze masks is quite low initially, and becomes even lower within a very short period as the mask becomes moist. But, gauze masks are easy to breathe through.

It is an object of this invention to provide a filtering web which will initially filter out bacteria from moisture laden air with a high degree of efficiency and which will retain its efficiency over a long period of time while still being sufficiently breathable, i.e. having a sufficiently low pressure drop thereacross, to be comfortable when used as a face mask filter. Another object is to provide an efficient filtering web which is sufficiently economical to be discarded after each use; still another object is to provide a readily disposable preformed face mask which conforms readily to the face. Other objects and advantages will become apparent as the description proceeds.

The filtering web of this invention is essentially a dimensionally stable, expanded lofty web of a blend of discontinuous, relatively coarse thermoplastic fibers and relatively fine thermostable fibers adhered to one another in a manner providing a lofty reticulated web while yet remaining dimensionally stable and resistant to matting, which web requires no inert filler fibers or the like in its formation.

This lofty filtering web is formed from a non-woven sheet material composed of a blend of heat shrinkable thermoplastic fibers and thermostable (meaning they are not significantly changed by temperatures to which the web may be subjected during its formation) filtering fibers. These blended fibers are formed into a non-woven sheet material by air deposition, or equivalent means. The blended fibers consist in parts by weight with respect to one another of about 20 to 80 parts of the larger heat shrinkable, thermoplastic fibers to 80 to 20 parts of the smaller thermostable fibers. The prefered range is between about 60:40 and 40:60 thermoplastic to filtering fibers. The fibers should all be of relatively small diameters, but not so small as to form a web having a high resistance to fluid flow therethrough.

Generally, it is more advantageous to measure the coarser thermoplastic fibers by denier rather than by diameter and these fibers should be between about ½ denier (about 5 microns) and 3 denier (about 20 microns) for breathe-through filtering webs. About 1½ denier (about 14 microns) thermoplastic fibers are preferred in the formation of face mask filter webs.

With respect to the finer thermostable filtering fibers, their size should be preferably on the order of about 1 micron in diameter to be most effective in the formation of breathable filter webs for face masks; however, the diameters may vary form about ½ micron to about 2½ microns and still provide useful face mask filter webs.

Of course, a small proportion of the smaller and larger fibers of both the thermoplastic and thermostable fibers may be present through the blending operation or the initial selection of the fibers to be blended and in small proportions these larger or smaller diameter fibers do not significantly adversely effect the filter.

When the filter web is to be formed for industrial applications outside the area of face masks and the like where breathability is not a requirement and/or the filtration of large size particles rather than fine sized moisture droplets such as form on breathing, filter webs made in accordance with the teachings of this invention can be made using larger or smaller fibers depending on the sizes, velocity of flow, and other conditions of the industrial wastes to be filtered, etc.

Heat shrinkable thermoplastic fibers useful in the practice of the invention are those which shrink significantly when subjected to temperatures in the range of the softening temperature of the fiber. A preferred fiber to accomplish this function has been found to be "Vinyon HH," a trade name of American Viscose Company, for a vinyl acetate modified vinyl chloride polymer, the polymer being about 10% vinyl acetate. This polymer has a softening temperature of about 165° F. Among other fibers which display this heat shinkable property which makes them useful in this invention are undrawn "Dacron" (a trademark of E. I. du Pont de Nemours & Company for polyester fibers of terephthalic acid and ethylene glycol), "Dynel" (a trade name of Union Carbide for a 40:60 acrylonitrile and vinyl chloride copolymer), and polyvinyl alcohol. The amount of shrinkage of the fiber when subjected to a temperature range of at least as high as its softening temperature should be at least about 50%. It is to be understood that the temperature of the heat source may be quite high, e.g. 1500° F. or above, but that the distance and/or duration of exposure of the sheet material to the heat given off by the heat source is such that the thermoplastic fiber is subjected to a temperature in a range sufficient to tackify and shrink the fiber without degradation of the polymer.

Any suitable thermostable filtering fibers may be utilized such as asbestos, rayon, nylon, and glass. Glass fibers are presently preferred because of their availability in small diameters.

In the formation of a preferred filtering web of the type contemplated for use in face masks and in other fine particle filtration environments in accordance with this invention, a fiber blend is prepared of fibers having lengths of from about ½ to 2 inches composed of about 60% "Vinyon HH" fibers and 40% glass fibers. The denier of the "Vinyon HH" fibers is about 1½, as an average, and the glass fibers utilized are, as an average, about 1 micron in diameter. The fibers are blended by any suitable means so that a more or less homogeneous blend reults. The blended fibers are then formed into a non-woven sheet material by air deposition onto a screen. The resulting sheet material, which can be from about 50 to 100 mils or greater in thickness, is extremely weak and must be handled with care. It is very fragile, even with an apparent thickness of about 100 mils.

The blending of the fibers is carried out by any suitable means and formation of the initial sheet material from the blended fibers by air deposition may be readily carried out utilizing a Rando-Feeder and Rando Webber combination machine, which combination feeds the blended fibers into a high velocity air stream, depositing the blended fibers on a moving screen to the opposite side of which suction is continually applied. Since no bonding agent is used, as it might detract from the filtering properties of the fibers, the resulting non-woven sheet material is quite loose and weak and, as noted hereinbefore, is not sufficiently self-supporting to be handled in the usual manner of paper or fabrics. This product has a weight of about 25 lbs. per 320 sq. yd. ream.

The resultant product is then subjected while still in continuous strip form on the moving screen to heat treatment for 2 to 3 seconds about 2 to 4 inches distant from heat lamps having bulb temperatures around 1500° F. The temperature achieved by the thermoplastic fibers under these conditions is sufficient to soften the fibers without degrading the polymer. The short period of time coupled with the distance from the heat source and the intertwining of the thermoplastic fibers with the thermostable fibers is insufficient to melt the thermoplastic fibers to a point wherein they lose their fibrous shape but quite effectively tackifies and shrinks them. It is important that the heating be carried out without any restraint or pressure on the sheet material so that no interference with expansion into a lofty web is encountered. This heating operation causes the sheet material to decrease in area while increasing in thickness and in effect converts the sheet material from a weak, loose product into a strong, self-supporting lofty filtering web having approximately twice the thickness of the original sheet material. The resulting web is readily self-sustaining in sheet form and is resistant to matting upon handling while possessing a void volume of greater than about 95%, which offers little resistance to the flow of air therethrough.

The fiber integrity of the thermoplastic fibers does not appear to be significantly disturbed by this treatment and while the width of the filtering web is about 40% less than the width of the starting sheet material the apparent thickness of the filtering web is more than twice that of the original sheet material and this distinction is reflected in the different ream weights of the two materials. The initial ream weight of the starting sheet material is about 25 lbs. per ream whereas the finished filtering web displays a ream weight of about 60 lbs. per ream.

Apparently, the heat tackifies the larger thermoplastic fibers causing the smaller filtering fibers to adhere thereto so that the subsequent shrinkage of the thermoplastic fibers which draws the filtering fibers closer to one another does so in a manner that does not markedly change the openness of the sheet structure. Thus, an apparent void volume of about 99.5% in the starting sheet material results in a final void volume in the finished filtering web of about 99%. Further, the filtering fibers apparently assist in maintaining the fibrous structure of the thermoplastic fibers upon heating since these thermoplastic fibers when heated alone under the lamps shrink 300% or more and tend to form beads whereas when incorporated into the sheet structure the shrinkage of the sheet structure is only about 50% with no apparent significant beading of the thermoplastic fibers.

This filter web has been found to filter much more effectively than gauze with no decrease in efficiency over a considerable period of time. Test procedures showing a comparison of the two types of filter webs are set forth hereinafter.

Heretofore, insofar as we are aware, when filtering webs were made having thermoplastic binder fibers, they were formed under heat and pressure with the thermoplastic fibers being compressed and fused to bind the filtering fibers together, such an operation requiring further a filler fiber of some inert substance to separate the filtering fibers and to prevent them from being fused into a non- or low-filtering mat. We believe ourselves to be the first to discover that an effective filter can be made solely from filtering fibers and heat shrinkable thermoplastic fibers which filtering material is handleable and mat or compression resistant, as well as being an exceedingly efficient filtering medium. Even though a filtering web made in accordance with this invention has considerable structural integrity, in its preferred form for face masks it possesses a void volume of better than 95%, a significant factor from the standpoint of breathability through the filtering medium.

Referring now to the accompanying drawing:

FIGURE 1 discloses a cross sectional view of the filtering sheet material after formation by air deposition;

FIGURE 2 is a cross sectional view of the filtering web produced from the sheet material of FIGURE 1;

FIGURE 3 is a cross sectional view of the filtering web formed into a face mask pad;

FIGURE 4 is a front view of a face mask utilizing the pad of FIGURE 3;

FIGURE 5 is a cross sectional view taken substantially along the plane of section line 5—5 of FIGURE 4; and FIGURE 6 is a schematic illustration of a mechanism for testing filter efficiency.

Because of the nature of the construction, it is not feasible to illustrate the differences in fiber arrangement between the starting air deposited sheet material of 10 illustrated in FIGURE 1 and the resultant filtering web 12 formed from this sheet material illustrated in FIGURE 2 except by observing the relative differences in thickness areas. Thus the differences between these two non-woven sheet materials have been depicted by showing the filter web 12 as having approximately twice the thickness and half the area of the starting sheet material 10 of FIGURE 1.

In FIGURE 3, a filtering pad 14 is formed by encasing a disc cut from the web 12 between panels formed of a covering material 16 of a diaphanous non-woven fabric and sealed around its edges as at 18. Thus, the filtering pad 14 is housed within an envelope formed by the non-woven covering material 16. When the filtering pad is formed from the preferred filtering web described hereinbefore, it has been calculated that for an 8½ centimeter in diameter pad, about 62 miles of glass fiber are found. Yet, the pad, even with the encasing envelope, still displays an apparent void volume of about 96.5%.

The non-woven covering material forming the envelope may be any suitable, preferably highly reticulated, sheet material. The primary function of the envelope is to prevent possible chafing or the like by stray fibers of the wearer of the mask. A 60:40 blend of "Vinyon HH" fibers of the same denier or of larger denier than those used in the formation of the filtering web and viscose rayon staple fibers of similar denier has been found to be quite effective for this envelope. The blended fiber has incorporated therewith a binder emulsion of polyethyl acrylate to give it structural integrity and strength. By the application of heat and pressure around the edges which may be accomplished with conventional heat sealing equipment, the layers 16 are sealed to one another as at 18 around their periphery forming the envelope within which the filtering web disc is housed.

Thereafter, the pad 14 is utilized as the filtering face 20 on the mask 22 of FIGURE 4. The mask shell 26 is preferably a stiff, yet flexible, thin foamed polystyrene shell of generally frusto conical shape in profile. However, any suitable shell material can be used and face mask shells of cellulose acetate and polyethylene have been found satisfactory. A raised nose piece 28 is formed at the top of the shell, and the back edge of the shell also has an outwardly flared edge rim 30 therearound so that the mask can be readily fitted to the face. Ears 32 project from the flared edge 30 of the mask and a suitable elastic band 34 extends through holes 36 in the ears 32 and through further apertures (not shown) in forwardly projecting lugs 38 of the ears 32. Then, small metal cross bars 40 (such as the metal ends found on shoe laces) are attached to the ends of the elastic band seat against the lugs 38 of the ears 32 to prevent withdrawal of the elastic band from the mask. The pad 14 covering the front of the mask 28 is attached thereto by heat sealing of the peripheral rim 18 thereof to the front opening rim 42 of the mask shell.

The mask is, of course, subject to wide variation in its design details but the particular one illustrated has been found to fit, when made in a variety of sizes, sufficiently snugly against any of the major facial types to prevent any significant air escape around the periphery thereof. The mask is inexpensive and is disposable after use.

Testing of the mask has been carried out in comparison with a conventional, gauze mask used in hospital operating rooms under controlled conditions whereby an aerosol of bacteria and moist air is introduced into a continuously flowing air stream and passed through the filter. These tests revealed upon comparison of these new masks with both new and laundered gauze masks that the surgical mask of this invention filtered out about 90% of the bacteria from the air stream passing therethrough for the first five minutes, and after about 30 minutes continued to filter out about 90% of the bacteria from the air stream passing therethrough. Gauge masks, on the other hand, when subjected to this test displayed a filtration efficiency after 5 minutes of 30% removal of the bacteria from the air stream and after 30 minutes only 8% removal.

In a second set of comparisons, the new surgical mask of this invention displayed 85% bacteria removal after 2 minutes and 90% bacteria removal after 30 minutes from the air stream whereas gauze masks subjected to the same test displayed about 40% removal of bacteria after 2 minutes and less than 10% removal after 30 minutes.

These comparisons were obtained by tests conducted using an apparatus of the type schematically illustrated in FIGURE 6.

An air stream was directed through pipe line 44 to which a flow meter was attached to regulate the air flow at about 10 liters per minute. The air flow activated a nebulizer attached to the line which contained 5 milliliters of a diluted culture of serratia marcescens bacteria in such a manner that the diluted culture was sucked into the air stream as it passed thereover. Thus, the air stream contained an aerosol of bacteria which was then passed through the filter mask and thereafter through a bacteria collecting microporous membrane filter (the particular one being used was a "Millipore" filter made by the Millipore Filter Corporation of Bedford, Mass.). In the first series of tests, the air valve 46 of line 44 was closed after two minutes and, in the second series of tests, after 5 minutes, the membrane filter removed and placed in a petri dish containing a nutrient agar. This procedure was again repeated after 30 minutes.

Several filters of each type were used in both series of tests. In both series of tests, after incubation of the nutrient treated membrane filter at 37° C. for 48 hours, bacterial counts were determined from the nutrient growth medium. The bacteria collected on the "Millipore" membrane filter represented that which passed through the surgical mask or filter. The filtering efficiency of the surgical mask of this invention and the gauze masks was determined by the following equation:

$$\text{Percent efficiency} = \frac{\text{(control counts)} - \text{(test counts)}}{\text{(control counts)}} \times 100$$

The shape of the mask is such that when in place over the face it allows very little air leak around the edges; this tends to eliminate fogging of glasses, etc. These new masks present no difficulty in speaking, not significantly dampening either volume or clarity of sound. Because the mask is discardable after each use, washing, handling and sterilization problems encountered with gauze masks are obviated. The mask is extremely light, weighing about 1/10 of an ounce.

Breathability of a filter media is usually determined by the pressure drop across the media of an air stream. In an Army Chemical Warfare study it was noted that respiratory masks are designed to provide a pressure drop of about 0.4 in. through the filter media when the media is placed in an air stream having a velocity of 10 liters per minute. A mask is still considered breathable for adults and children at 0.8 in. pressure drop and for male adults at 1.2 inches pressure drop (AMA Archives of Industrial Health, August 1959, vol. 20, pp. 91–95).

Upon measurement of the pressure drop across the mask filter 14 of this invention in the apparatus of FIGURE 6 by means of a manometer 48, at an air flow rate of 10 liters per minute a pressure drop averaging about 0.17 in. was observed, a pressure drop much lower than that noted as standard in the study referred to hereinabove.

What is claimed as new is as follows:

1. A filtering web comprising a lofty, cohesive, nonwoven, reticulated structure resistant to matting, said web being composed of a blend of relatively large discontinuous heat shrunken thermoplastic fibers and relatively fine thermostable filtering fibers, said fibers having a length of from about ½ to about 2 inches, said web containing from about 20 to about 80% by weight filtering fibers, said thermoplastic fibers having a size range of from about 1 denier to 2½ denier and said filtering fibers having a size range of from about 0.5 to about 2.5 microns and being thermostable at temperatures necessary to tackify and shrink said thermoplastic fibers, said thermostable and said thermoplastic fibers having been adhered to one another by subjecting an uncompressed blend of said fibers to substantially unrestrained shrinkage at a temperature in the softening range of said thermoplastic fibers for a period of time sufficient to adhere said fibers to one another and to shrink said thermoplastic fibers while preserving said thermoplastic fibers in their fiber form.

2. A filtering web comprising a lofty, non-woven reticulated structure resistant to matting and having a void volume of at least about 95%, said web being composed of a blend of heat shrunken vinyl chloride polymer fibers in a size range of from about 1 denier to about 2½ deniers and thermostable glass filtering fibers in a size range of from about 0.5 to about 2.5 microns, said vinyl chloride and said glass fibers having been adhered to one another by subjecting an uncompressed blend of said fibers to substantially unrestrained shrinkage at a temperature in the softening range of said vinyl chloride polymer for a period of time sufficient to adhere said fibers to one another and to shrink said vinyl chloride polymer fibers while preserving said vinyl chloride polymer fibers in their fiber form.

3. A filtering web comprising a lofty, non-woven reticulated structure resistant to matting and having a void volume of at least about 95%, said web being composed of a blend of heat shrunken vinyl chloride polymer fibers in a size range of from about 1 denier to about 2½ deniers and thermostable glass filtering fibers in a size range of from about 0.5 to about 2.5 microns, said glass fibers being adhered to said thermoplastic fibers in such manner that said thermoplastic fibers retain their fibrous character and maintain said glass fibers separated from one another, the proportion of vinyl chloride polymer fibers to glass fibers in parts by weight being about 40:60 to about 60:40, said vinyl chloride polymer and said glass fibers having been adhered to one another by subjecting an uncompressed blend of said fibers to substantially unrestrained shrinkage at a temperature in the softening range of said vinyl chloride polymer for a period of time sufficient to adhere said fibers to one another and to shrink said vinyl chloride polymer fibers while preserving their fiber identity.

4. In a surgical face mask comprising a thin mask shell faced with a breathe-through filter pad; the improvement comprising said filter pad comprising a lofty, cohesive, non-woven reticulated web resistant to matting and having a void volume of at least about 95%, said web being composed of a blend of heat shrunken thermoplastic vinyl chloride polymer fibers in a size range of from about one denier to about two and one-half denier, and thermostable glass filtering fibers in a size range of from about 0.5 to about 2.5 microns, said glass fibers having been adhered to said thermoplastic fibers by heat tackifying and unrestrained substantially pressure free shrinkage of said thermoplastic fibers to thereby form said lofty, cohesive web wherein said thermoplastic fibers retain their fibrous character and maintain said glass fibers separated from one another, the proportion of vinyl chloride polymer fibers to glass fibers in parts by weight being about 40:60 to about 60:40.

5. A lofty filtering web comprising a cohesive, non-woven blend of heat-shrunken thermoplastic fibers and thermostable filtering fibers consisting in parts by weight with respect to one another of between about 60:40 and 40:60 thermoplastic to filtering fibers, said thermoplastic fibers having a diameter in the range of about 5 to 20 microns and said thermostable filtering fibers having diameters in the range of from about 0.5 to about 2.5 microns, said thermostable and said thermoplastic fibers having been adhered to one another by subjecting an uncompressed blend of said fibers to substantially unrestrained shrinkage at a temperature in the softening range of said thermoplastic fibers for a period of time sufficient to adhere said fibers to one another and to shrink said thermoplastic fibers while preserving their fiber form.

6. A lofty filtering web comprising a non-woven blend of thermoplastic fibers and thermostable filtering fibers consisting in parts by weight with respect to one another of between about 60:40 and 40:60 thermoplastic to filtering fibers, said thermoplastic fibers having a diameter in the range of about 5 to 20 microns and said thermostable filtering fibers having diameters in the range of from about 0.5 to about 2.5 microns, said thermoplastic fibers being formed of vinyl acetate modified vinyl chloride polymer, said thermoplastic fibers and said thermostable filtering fibers being adhered to one another and free from additional bonding agents, said thermostable and said thermoplastic fibers having been adhered to one another by subjecting an uncompressed blend of said fibers to substantially unrestrained shrinkage at a temperature in the softening range of said thermoplastic fibers for a period of time sufficient to adhere said fibers to one another and to shrink said thermoplastic fibers while preserving their fiber form.

References Cited by the Examiner

UNITED STATES PATENTS

| 1,897,976 | 2/1933 | Birkholz | 55—500 |
| 2,357,392 | 9/1944 | Francis | 156—28 |
| 2,888,012 | 5/1959 | Larson | 128—146 |
| 2,910,763 | 11/1959 | Lauterbach | 28—72.2 |
| 2,988,468 | 6/1961 | Strickel et al. | 156—35 |
| 3,014,479 | 12/1961 | Matheson | 128—146 |

FOREIGN PATENTS

| 780,709 | 8/1957 | Great Britain. |

RICHARD A. GAUDET, *Primary Examiner.*

W. E. KAMM, *Assistant Examiner.*